United States Patent
Lyons et al.

[11] Patent Number: 6,116,368
[45] Date of Patent: Sep. 12, 2000

[54] ELECTRIC VEHICLE WITH BATTERY REGENERATION DEPENDENT ON BATTERY CHARGE STATE

[75] Inventors: Arthur Paull Lyons, Maine; Timothy Michael Grewe, Endicott, both of N.Y.

[73] Assignee: Lockheed Martin Corp., Johnson City, N.Y.

[21] Appl. No.: 09/044,670

[22] Filed: Mar. 20, 1998

Related U.S. Application Data

[60] Provisional application No. 60/066,736, Nov. 21, 1997.

[51] Int. Cl.[7] ................................................ B60K 25/10
[52] U.S. Cl. ......................... 180/165; 180/65.2; 180/65.6
[58] Field of Search ..................................... 180/165, 65.1, 180/65.2, 65.3, 65.4, 65.6

[56] References Cited

U.S. PATENT DOCUMENTS

| | | | |
|---|---|---|---|
| 3,675,099 | 7/1972 | Johnston | 318/211 |
| 4,908,553 | 3/1990 | Hoppie et al. | 318/382 |
| 5,036,934 | 8/1991 | Nishina | 180/165 |
| 5,291,960 | 3/1994 | Brandenburg et al. | 180/65.2 |
| 5,318,355 | 6/1994 | Asanuma et al. | 180/165 |
| 5,399,000 | 3/1995 | Aoki et al. | 180/165 |
| 5,476,310 | 12/1995 | Ohtsu et al. | 180/165 |
| 5,659,235 | 8/1997 | Yamada et al. | 318/801 |

FOREIGN PATENT DOCUMENTS

| | | |
|---|---|---|
| 0611675 | 2/1994 | European Pat. Off. . |
| 0645278 | 3/1995 | European Pat. Off. . |
| 0611675 | 8/1994 | France . |
| 0782941 | 7/1997 | France . |
| 2224171 | 9/1989 | United Kingdom . |
| 9607560 | 8/1995 | WIPO . |

*Primary Examiner*—Richard M. Camby
*Attorney, Agent, or Firm*—W. H. Meise; G. H. Krauss

[57] ABSTRACT

An electric vehicle is controlled to conform its operation to that of a conventional internal-combustion-engine powered vehicle. In some embodiments, the charging of the batteries by the auxiliary source of electricity and from dynamic braking is ramped in magnitude when the batteries lie in a state of charge between partial charge and full charge, with the magnitude of the charging being related to the relative state of charge of the battery. The deficiency between traction motor demand and the energy available from the auxiliary electrical source is provided from the batteries in an amount which depends upon the state of the batteries, so that the full amount of the deficiency is provided when the batteries are near full charge, and little or no energy is provided by the batteries when they are near a discharged condition. At charge states of the batteries between near-full-charge and near-full-discharge, the batteries supply an amount of energy which depends monotonically upon the charge state. Charging of the batteries from the auxiliary source is reduced during dynamic braking when the batteries are near full charge. Control of the amount of energy returned during dynamic braking may be performed by control of the transducing efficiency of the traction motor operated as a generator.

3 Claims, 8 Drawing Sheets

Fig. 8

ELECTRIC VEHICLE WITH BATTERY REGENERATION DEPENDENT ON BATTERY CHARGE STATE

This patent application claims priority of Provisional patent application Ser. No. 60/066,736, filed Nov. 21, 1997.

FIELD OF THE INVENTION

This invention relates to apparatus and method for making the operation and operating characteristics of hybrid electric vehicles simple and effective.

BACKGROUND OF THE INVENTION

Hybrid electric vehicles are widely viewed as being among the most practical of the low-polluting vehicles. A hybrid electric vehicle includes an electric "traction" battery which provides electric power for an electric traction motor, which in turn drives the wheels of the vehicle. The "hybrid" aspect of a hybrid electric vehicle lies in the use of a secondary or supplemental source of electrical energy for recharging the traction battery during operation of the vehicle. This secondary source of electrical energy may be solar panels, a fuel cell, a generator driven by an internal combustion engine, or generally any other source of electrical energy. When an internal combustion engine is used as the secondary source of electrical power, it commonly is a relatively small engine which uses little fuel, and produces little pollution. A concomitant advantage is that such a small internal combustion engine can be operated within a limited RPM range, so that pollution controls of the engine may be optimized. The terms "primary" and "secondary" when used to describe the sources of electrical energy merely relate to the way energy is distributed during operation, and are not of fundamental importance to the invention. A simple electrically driven vehicle powered only by electrical batteries has the disadvantages that the batteries may become depleted while the vehicle is far from a battery charging station, and even when such a vehicle successfully returns to its depot after a day's use, the batteries must then be recharged. The hybrid electric vehicle has the significant advantage over a simple electrically powered vehicle that the hybrid electric vehicle recharges its own batteries during operation, and so should not ordinarily require any external battery charging. Thus, the hybrid electric vehicle can be used much like an ordinary vehicle powered by internal combustion engines, requiring only replenishing of the fuel. Another major advantage of the hybrid electric vehicle is its good fuel mileage. The advantage in fuel mileage arises from the use of regenerative dynamic braking, which converts kinetic energy of motion into electrical power during at least a portion of braking, and returns the energy to the battery. It has been found that braking losses account for somewhere near half of all the frictional losses experienced by a vehicle in an urban transit setting. The recovery of this 50% of energy, and returning it to the batteries for further use, permits the use of a much smaller "secondary" fuel-operated electrical generator than would be the case if regenerative braking were not used. In turn, the smaller secondary electrical source results in less fuel used per unit time, or per mile. Yet another advantage of a hybrid electric vehicle is that under many conditions, the power which is available for accelerating the vehicle is the sum of the maximum power which can be supplied by the batteries plus the maximum power which can be generated by the secondary electrical generator. When the electrical generator is a diesel-powered internal combustion engine, the combination of the battery power and the diesel power can result in a total motive force which is quite substantial, notwithstanding the good fuel mileage.

While hybrid electric vehicles are economically and environmentally advantageous, they must be somewhat "foolproof", in that they must be similar to conventional internal-combustion-powered vehicles, in their operation and in their responses to operator input, in order to achieve widespread acceptance.

SUMMARY OF THE INVENTION

A method for operating a vehicle which derives at least some of its tractive effort or motive power from one or more electric batteries ("batteries") includes the step of returning substantially all of the energy from a traction motor to the batteries during dynamic braking during those times when the batteries are at a first charge condition which is less than full charge. Other steps of the method include returning less than all of the energy from the traction motor to the batteries during dynamic braking when the batteries are at a charge level between the first charge condition and the full-charge condition, and returning substantially no energy from the traction motor to the batteries during braking when the batteries reach the full-charge condition. In this embodiment, the step of returning less than all of the energy from the traction motor to the batteries includes the step of returning an amount of the available dynamic braking energy to the batteries which is monotonically related to the proportion of the present-time battery charge relative to the full-charge condition. In a preferred embodiment of the invention, the abovedescribed steps transition smoothly from one to the other depending upon the state of charge of the batteries. As the amount of dynamic braking changes gradually as a function of battery charge, the friction brakes take up any deficiency in braking, automatically as a result of operator brake pedal force.

DESCRIPTION OF THE INVENTION

Figure 1:
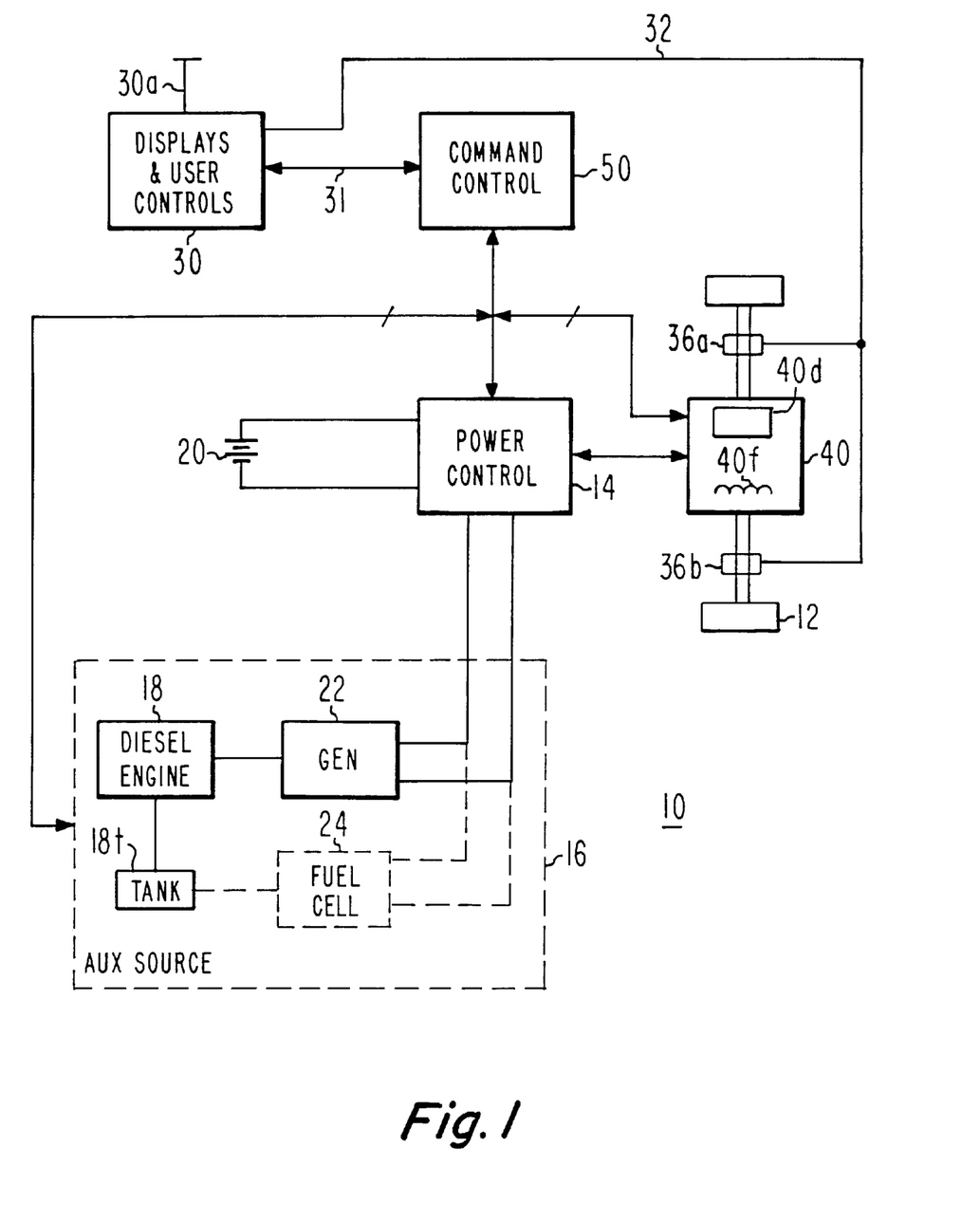
FIG. 1 is a simplified block diagram of an electric vehicle according to an aspect of the invention, including a command controller which performs control in accordance with the invention, and also including a power controller.

In FIG. 1, an electric vehicle 10 includes at least one drive wheel 12 connected to an alternating voltage electric traction motor 40, which in one embodiment of the invention is a three-phase alternating-current motor. Motor 40 is preferably a motor-generator, as known, so that kinetic energy of motion can be transduced into electrical energy during dynamic braking. A power controller 14 is connected by power-handling paths to traction motor 40, to a traction battery illustrated as 20, and to an auxiliary source of electrical energy illustrated as a block 16. As illustrated in block 16, the auxiliary source may include an internal combustion engine such as a diesel engine 18 driving an electrical generator 22, or it may include a fuel cell 24. A command controller illustrated as a block 50 is connected by means of information paths to power controller 14, auxiliary source 16, and to traction motor 40, for controlling the operation of the power controller 14, auxiliary source 16, and to traction motor 40 in accordance with appropriate control laws.

One of the most common and least expensive types of batteries which is capable of storing relatively high power includes the common lead/$H_2SO_4$ battery. This type of battery is suitable for use in an electric vehicle, if some care is taken to prevent application of a charging current thereto when the battery is at full charge, to prevent gassing of the electrolyte and undesired heat generation, and if sulfation can be avoided. Two copending patent applications Ser. Nos. 08/961,571 and 08/961,573, filed Oct. 30, 1997 in the name of Hoffman, Jr. and Grewe, and entitled METHOD FOR EQUALIZING THE VOLTAGE OF TRACTION BATTERY MODULES OF A HYBRID ELECTRIC VEHICLE and METHOD FOR MAINTAINING THE CHARGE CAPACITY OF TRACTION BATTERY MODULES OF A HYBRID ELECTRIC VEHICLE, respectively, describe control arrangements by which lead-acid batteries can be maintained to optimize their useful life and capacity, and describe various aspects of the care and use of such batteries.

In FIG. 1, the displays and operator controls of vehicle 10 are illustrated as a block 30. Block 30 is illustrated as being connected by a bidirectional data path 31 to command control block 50, for applying driving commands to command controller 50, which command controller 50 can then convert into appropriate commands to the various power elements, such as power controller 14, auxiliary source 16, and traction motor 40. Block 30 is also illustrated as being connected by a path 32 to friction brakes 36a and 36b, for direct control of the friction brakes by a conventional hydraulic braking system connected to a brake pedal.

Figure 2:
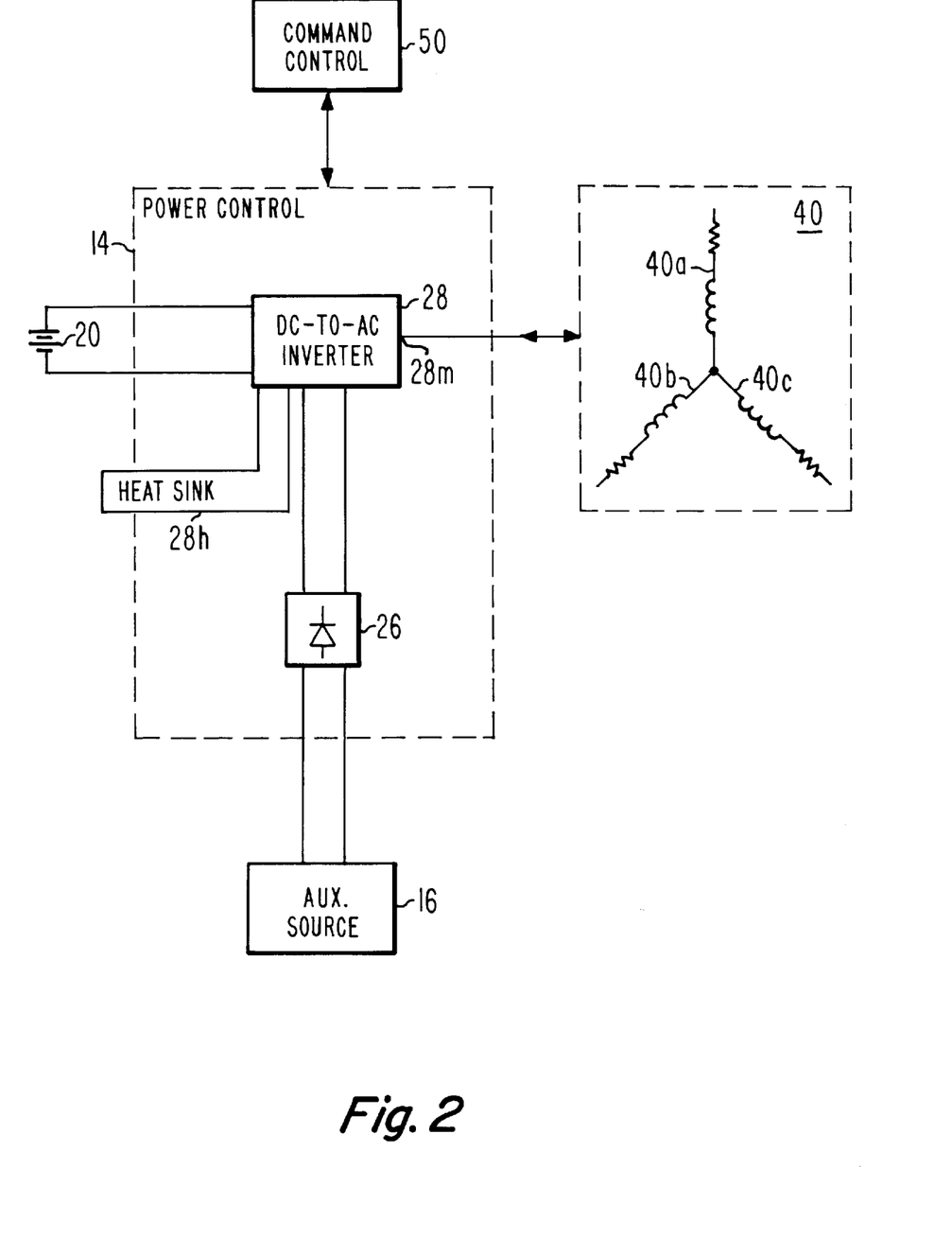
FIG. 2 is a simplified block diagram illustrating some of the functions performed within the power controller of FIG. 1.

FIG. 2 represents the interconnection of some of the elements of power controller 14 of FIG. 1 with other elements of FIG. 1. More particularly, power controller 14 includes a rectifier arrangement 26 connected to auxiliary source 16, for (if necessary) converting alternating-current output of the auxiliary source 16 into direct voltage. Power controller 14 also includes a bidirectional propulsion control system, which further includes a dc-to-ac inverter 28 coupled by power connections to battery 20, to rectifier arrangement 26, and to traction motor 40. The operations of the inverter 28, the auxiliary source 16, and traction motor 40 are controlled, as mentioned above, by command controller 50. It should be noted that in addition to the dc-to-ac inverter 28, the propulsion control system includes voltage and current sensors, to sense the various operating parameters of the motor/generator, battery, and auxiliary electrical source.

In basic operation of the arrangement of FIGS. 1 and 2, the command controller (50) controls the individual switches (not illustrated) of inverter 28 with pulse-width-modulated commands, which result in the generation, at that port 28m of the inverter 28 which is coupled to the traction motor 40, of an approximation of an alternating voltage having a selected frequency and magnitude. In a preferred embodiment of the invention, the inverter is a field oriented command (FOC) type, and traction motor is similarly an FOC induction motor. The frequency and magnitude of the commanded alternating current drive to the traction motor 40 are selected to drive the motor with a selected traction current at a selected motor speed. In general, traction motor 40 produces a back EMF which increases with increasing motor speed, and the inverter must produce (under the control of command controller 50) an alternating voltage which increases in magnitude with increasing alternating voltage frequency in order to maintain the same traction motor drive current. The motor rotates at a frequency consistent with the commanded frequency of the inverter output. Also in basic operation of an electric vehicle such as that of FIGS. 1 and 2, both dynamic braking and friction braking may be performed. The dynamic braking is much preferred, as the (kinetic) energy inherent in the motion of the vehicle is recaptured, by the traction motor operating as an electric generator, as the vehicle is slowed. During those intervals in which dynamic braking occurs, the dc-to-ac inverter 28 of FIG. 2, operating in a second or regenerating direction, converts the alternating voltage produced by the traction motor 40 into a direct voltage which charges traction battery 20. Further, when the electric vehicle is a hybrid electric vehicle, including the auxiliary electric source 16, the auxiliary source can be operated during operation of the vehicle to replenish the batteries andor to provide some of the traction energy, depending upon the commands of command controller 50.

It has been noticed that, when an electric vehicle is operated in a normal mode using dynamic braking, and the batteries are fully charged, the dynamic braking tends to push a charge current through the already-charged battery. The characteristics of a lead-acid battery are such that, in this situation of applying a charging current to a fully charged battery, the battery voltage tends to rise markedly, as from a fully charged, no-current value of 13 volts, in a nominally 12-volt battery, to somewhere near 16 volts, thereby providing an indication to the command controller that an overcharging condition is occurring. If the command controller decouples the energy generated by dynamic braking from the battery, as it must in order to protect the battery, the battery voltage immediately drops to its fully-charged no-current value. This, in turn, allows the dynamic braking controller to once again begin to provide energy to the battery until the overvoltage control takes effect. This results in periodic application of the dynamic braking at a pulse rate established by the loop characteristics of the command controller, and produces a perceivable braking chatter, as well as tending to overcharge the battery during portions of the pulse interval. Both the overcharging and the chatter are undesirable.

Figure 3A:
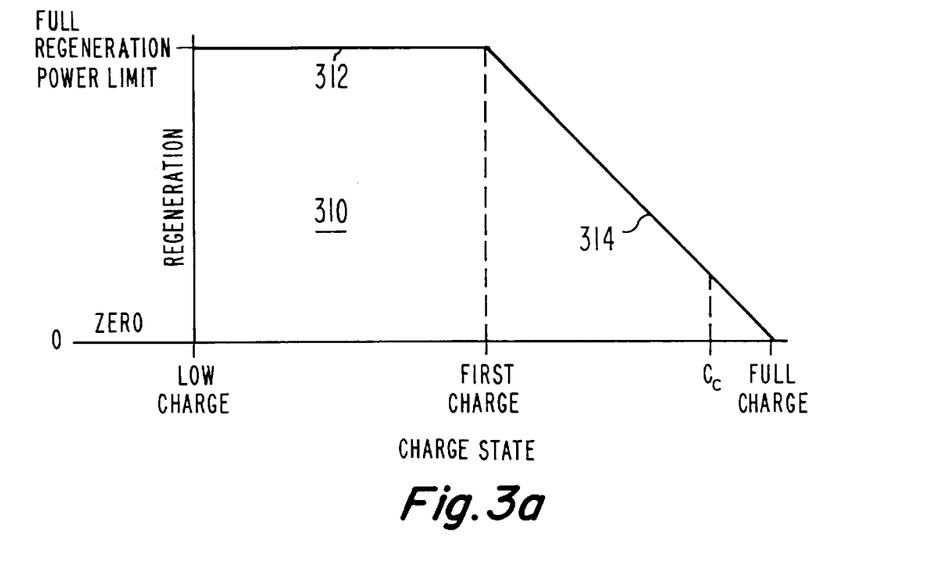
FIGS. 3a and 3b are simplified plots of energy regeneration to the traction battery versus traction battery charge state and traction due to regeneration versus traction battery charge state, respectively.
Figure 3B:
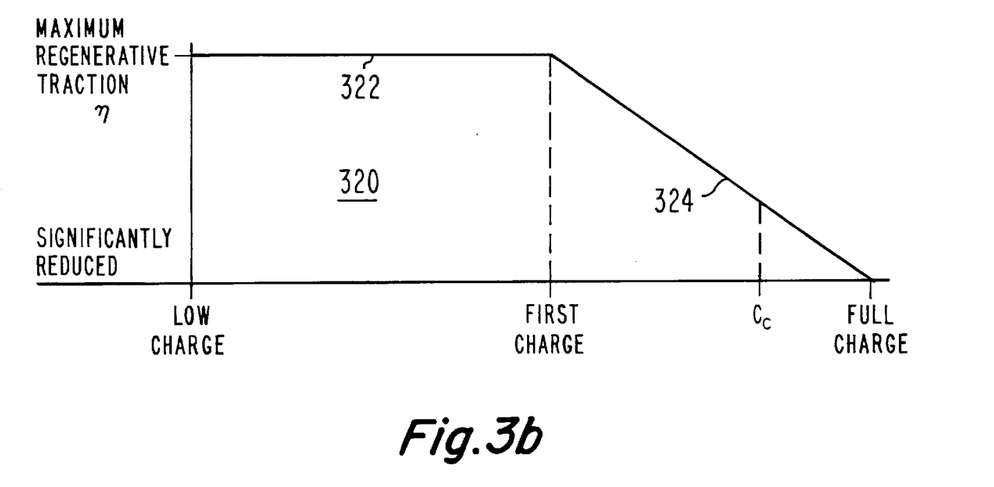

FIGS. 3a and 3b together illustrate a control law according to an aspect of the invention, which allows full regeneration or return to the traction batteries of energy derived from dynamic braking during those intervals in which the traction batteries are at a state of charge less than a particular amount of charge, which particular amount of charge is less than full charge, and which, at traction battery charge levels lying between the particular charge and full charge, tapers the proportion of the regenerated energy derived from dynamic braking in a manner which is responsive or a function of the then-existing state of charge relative to the difference in charge between the predetermined charge and full charge. In one embodiment of the invention, the relationship is monotonic, and the relationship may be linear. In FIG. 3a, plot 310 represents the amount of regeneration as a function of traction battery charge state pursuant to a control law in accordance with an aspect of the invention. More particularly, plot 310 defines a portion 312 which is constant at a value of dynamic braking regeneration which represents 100% regeneration, or as close to 100% as is conveniently possible. At full charge, the amount of regeneration of the energy derived from dynamic braking is reduced to near zero, or as close to zero as is conveniently possible. The control law represented by plot 310 further includes a second portion 314, which ramps monotonically from 100% regeneration at a predetermined traction battery charge level denominated "first charge" to zero regeneration at full charge of the traction battery. The effect on the regenerative traction or braking of the vehicle as a function of traction battery charge condition is illustrated by a plot 320 in FIG. 3b. In FIG. 3b, plot 320 includes a first portion 322, which extends at a constant value representing maximum regenerative traction from low charge levels to the "first" level of charge of the traction battery. A second portion 324 of plot 320 represents regenerative traction which ramps monotonically from 100% at the "first" charge level to 0% at full charge. While the portions 314 and 324 of plots 310 and 320, respectively, are illustrated as linear ramps, it is sufficient for control purposes that the portions 314 and 324 be monotonic. This monotonic reduction in dynamic braking should not be perceptible to the driver of the automobile, since the charge state of the traction battery changes slowly, and therefore the amount of regenerative braking changes slowly. Since the regenerative braking changes slowly, the friction brakes gradually take up any deficit between the dynamic braking and the desired braking force. This, in turn, should reduce the chatter which is evident when the control law simply protects the traction battery from overcharge by simply stopping the regeneration when the batteries are at full charge.

Figure 4:
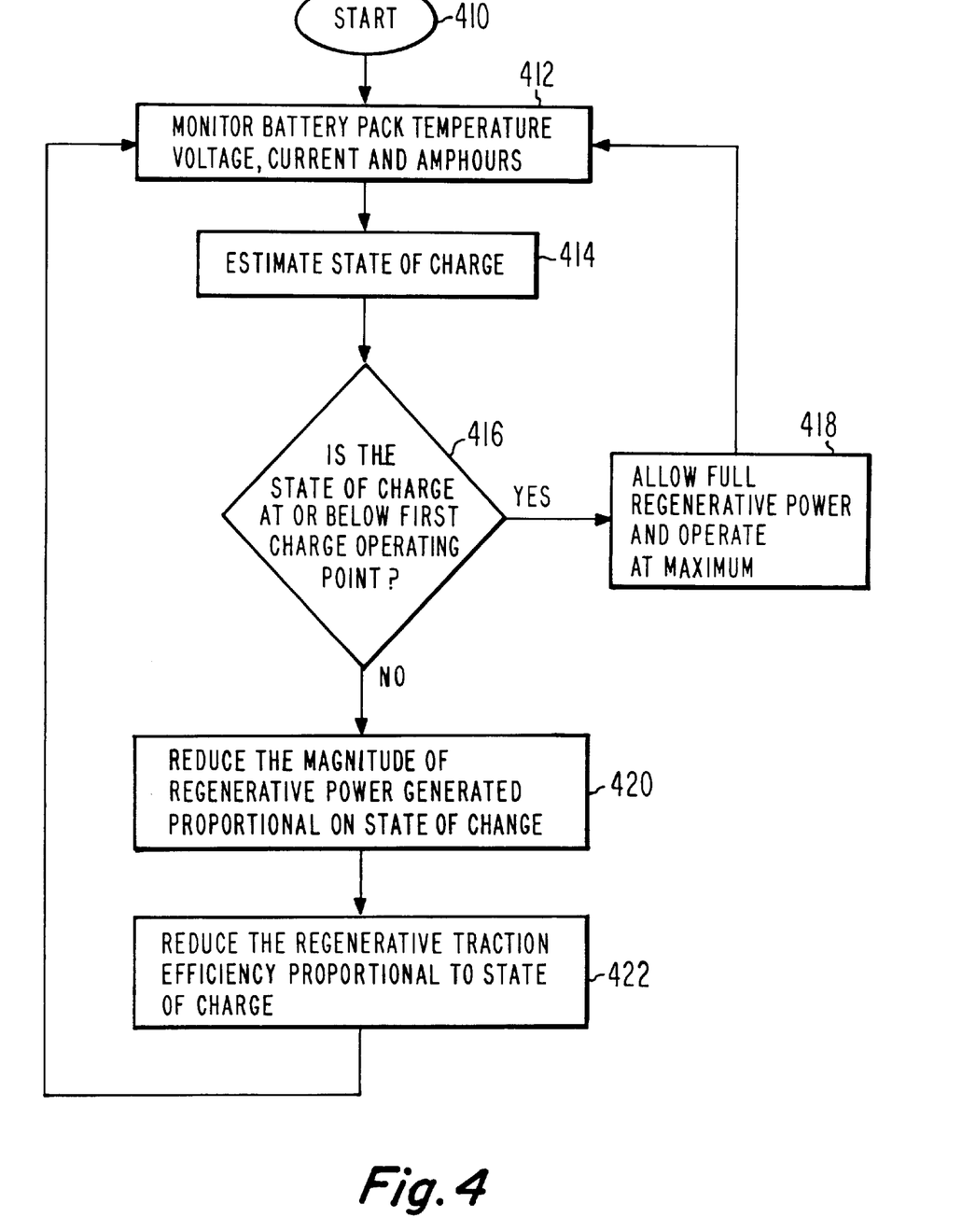
FIG. 4 is a simplified flow chart illustrating the logic flow in the command controller of FIGS. 1 and 2 to provide the operations illustrated in FIGS. 3a and 3b.

FIG. 4 is a simplified flow chart illustrating that portion 400 of the control laws controlling the control processor 50 of FIG. 1 which results in the type of performance represented by FIGS. 3a and 3b. In FIG. 4, the logic starts at a START block 410, and proceeds to a block 412, which represents monitoring the traction battery pack (20 of FIG. 1) parameters such as temperature, voltage, and current, and also noting time. Samples of these parameters may be taken at frequent sampling intervals, such as at each iteration of the logic through the loop of FIG. 4. From logic block 412, the logic flows to a block 414, which represents an estimation of the state of charge of the traction battery, by determining the amount of charge which has entered the battery, and subtracting the amount of charge which has left the battery. The measure of this charge is the amphour. Once an estimate is made of the state of charge of the traction battery, the logic flows to a decision block 416, which compares the current or present-time estimated state of charge of the traction battery with the predetermined value of charge represented by the "first charge" level of FIGS. 3a and 3b; as mentioned above, this charge level is less than full charge. If decision block 416 finds that the estimated charge level of the traction battery is less than the first charge level, the logic leaves decision block 416 by the YES output, and proceeds to a further block 418, which represents allowing full regenerative braking energy or power to be utilized. The action taken in block 418 may be, for example, adjusting the field current in the traction motor (operating in its generator mode) during braking so as to maximize the electrical output of the traction motor. It should be noted that some types of motor/generators have no distinct field winding, but rather have pluralities of windings in which one winding has its desired current induced or inducted by controlled current in another winding; for purposes of the invention, the way the field current is generated is irrelevant, it is sufficient that it is generated in the desired amount. From block 418, the logic flows back to block 412 to begin another iteration around the loop. As the hybrid electric vehicle is driven in this state, the traction battery will often become more fully charged due to the continuous injection of energy (by the action of the auxiliary internal-combustion-engine/generator) into the energy storage system which includes the traction battery and the motion of the vehicle.

Eventually, the state of charge of the traction battery will exceed the "first charge" level illustrated in FIGS. 3a and 3b. At that time, the iterations of the logic of controller 50 of FIG. 1 around the portion of its preprogrammed logic represented by logic loop 400 of FIG. 4 will change, since the logic flow will no longer be directed from the YES output of decision block 416, but will instead be directed to the NO output. From the NO output of decision block 416, the logic flows to a further block 420, which represents reduction of the magnitude of the regenerative power or energy available in the form of kinetic energy of the vehicle, in inverse relation or proportion to the present-time amount of charge relative to the difference between full charge and the first charge level of FIGS. 3a and 3b. Thus, if the current state of charge is at 70% of the way between the first charge and full charge, as illustrated by $C_c$ in FIGS. 3a and 3b, the amount of the energy of motion which is allowed to be recovered and coupled to the battery is 30%. When the current charge level reaches 100%, the allowable regeneration is 0%. As mentioned above, the control of coupling of energy or power from the traction motor acting as a generator can be accomplished simply by adjusting the command torque of the drive in a field oriented controlled alternating current motor. In an actual embodiment of the invention, the torque is reduced proportionally to speed in order to control the amount of power produced by the motor acting as a generator which is returned to the traction battery.

As so far described, the logic of FIG. 4 controls the regeneration in accordance with the state of charge of the traction battery. This means that the retarding force acting on the vehicle by the traction motor acting as a generator is reduced during braking. One of the advantages of an electric vehicle which uses regenerative braking is that the friction brakes are not required to do all of the braking, and so their design and construction may be such as to take advantage of the lesser usage, as for example by making them lighter in construction. As so far described in conjunction with the logic of FIG. 4, the dynamic braking is reduced under certain charge conditions of the traction battery. In order to provide additional braking during those times when the regenerative braking is reduced, according to another aspect of the invention, the logic flows from block 420 of FIG. 4 to a further block 422, which represents reduction of the efficiency of the traction motor acting as a generator. This reduction of the efficiency of the traction motor acting as a generator can be accomplished by adjustment of either the slip or of the current in the field winding, or preferably both. From block 422 of FIG. 4, the logic returns to block 412, to begin another iteration "around the loop" or through the logic 400.

As so far described, the chatter or uneven performance resulted from protection of the fully-charged battery from additional charge. A similar effect occurs upon acceleration with a nearly discharged battery. During acceleration of the vehicle 10 of FIG. 1, both the traction battery 20 and the auxiliary or secondary electrical source 16 (the internal-combustion-engine/generator) are available as sources of electrical energy for the traction motor 40. Consequently, the traction motor 40 can provide power at a rate which is the sum of the maximum power which can be drawn from the traction battery 20 together with the maximum power which the auxiliary source 16 can provide. This is convenient for operation in a city, where bursts of acceleration may require significant power. However, under some conditions, the traction battery protection controls, if they simply stop drawing power from the traction battery when the battery reaches a state of charge which is deemed to be a discharged state, will also cause a form of chatter. This form of chatter occurs if the vehicle is running uphill for a long period of time, such as in crossing the Continental Divide. If the rate of utilization of energy in raising the vehicle along the road exceeds the rate of delivery of energy by the auxiliary source 16, the batteries will continuously discharge, and eventually reach the level of charge deemed to be the "discharged" level. If, at that time, the traction battery controller were to simply cut the traction battery from the traction motor circuit, the amount of current available to the traction motor would suddenly decrease to the level provided by the auxiliary source 16, with a consequent abrupt change in tractive power, and the vehicle would experience a sudden reduction in speed. Removal of the traction battery discharge to the traction motor, however, allows the battery voltage to rise abruptly to its no-load voltage. If the controller interprets this rise in voltage as indicating that the traction battery has usable charge, it may reconnect the traction battery to the traction motor, thereby once again providing additional tractive power from the traction battery, but causing the voltage of the traction battery to drop. Those skilled in the art will recognize this as an oscillatory condition, which may cause the vehicle to "chug" or lurch repeatedly during the climb.

It should be noted at this point that a "fully" discharged battery, in the context of a traction battery in which long life is desired, still contains a substantial charge, because the life of such batteries is dramatically reduced if the depth of discharge is too great; thus a discharge battery for the purposes of discussion of electrically driven vehicles is one in which the batteries are at a state of charge which is deemed to be the full-discharged condition, but which still contains a substantial charge. In a hybrid electric vehicle, the auxiliary energy source provides energy continuously, which can be used to charge the traction batteries if the traction demand is less than the output of the auxiliary energy source. The control laws allow both the auxiliary energy source and the traction batteries to provide energy to the traction motor. When traction motor demand exceeds auxiliary source output, current is drawn from the traction battery, which causes its voltage to drop. If the traction battery is near a full discharge condition, the voltage drop due to this current draw may be such as to trigger battery protection by stopping the current drain from the battery. The removal of the current drain by the control laws, in turn, causes the vehicle to be powered solely by the auxiliary source, and allows the voltage of the traction battery to rise. When the traction battery rises, the control laws no longer recognize the battery as being discharged, and current drain is again allowed from the traction battery. The process of repeatedly coupling and decoupling the traction battery to the traction motor constitutes an oscillation of the control system. This oscillation results in a traction force which varies at the control system oscillation rate, and which may be perceptible to the operator of the vehicle.

Figure 5:
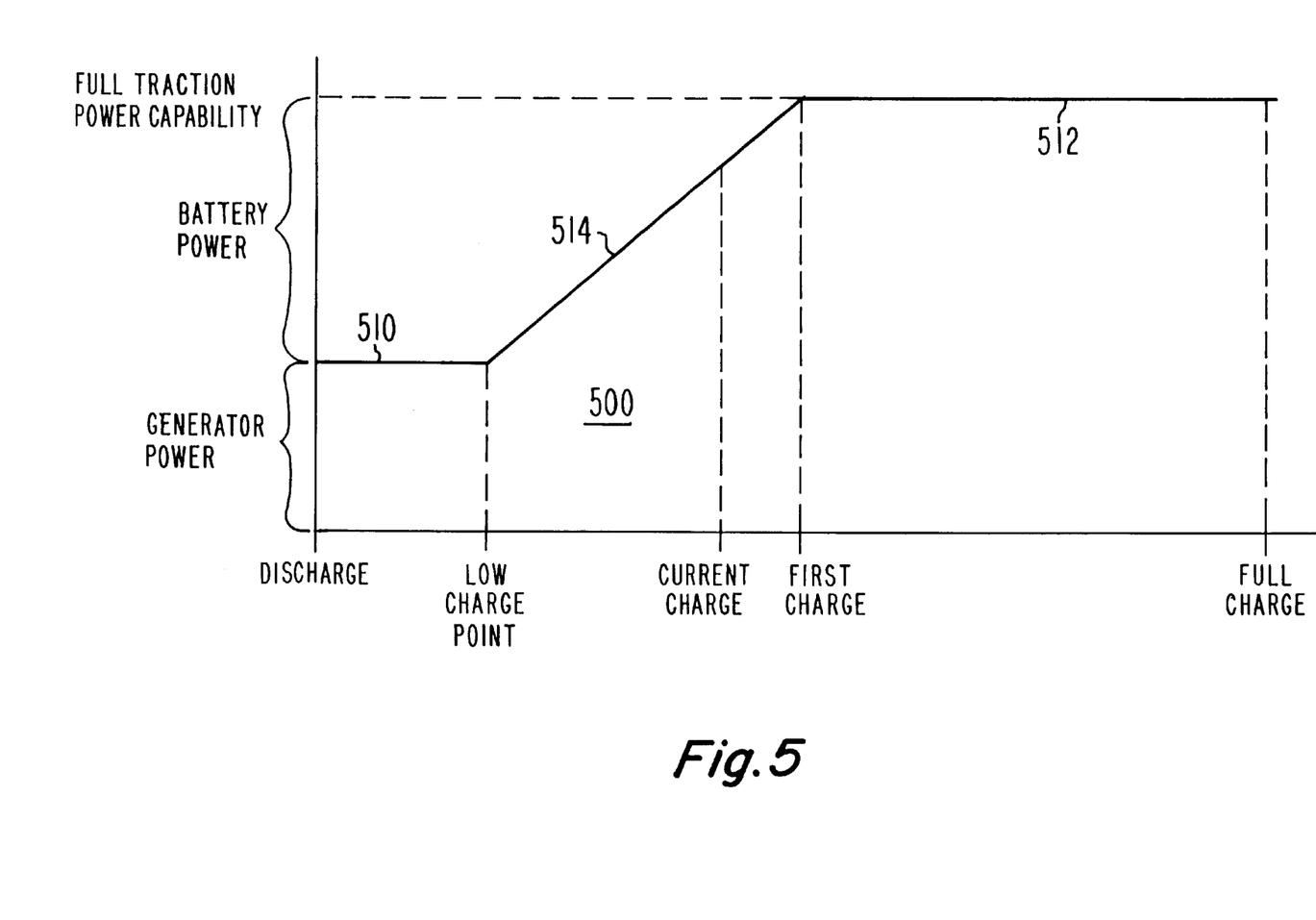
FIG. 5 illustrates a simplified plot of the distribution of the supply of traction power to the traction motor of the vehicle of FIG. 1 as a function of traction battery charge.

According to another aspect of the invention, controller 50 controls the amount of power which can be drawn from the traction battery in response to the state of charge of the traction battery. This avoids the abovedescribed "chugging" situation, and allows a smooth decrease in the speed with which the vehicle can climb a mountain as the battery charge decreases. FIG. 5 illustrates a plot 500 which represents the result of control in accordance with this aspect of the invention. In FIG. 5, traction power available to the vehicle is plotted against the state or level of charge of the traction battery. Plot 500 includes a portion 510, which represents the continuous output of the auxiliary source of electrical energy or power, which is a relatively low level. Plot portion 510 extends from a level less than the nominal discharge condition to a charge level designated as "low charge point," which is the nominal discharged condition of the traction battery. In an operating region represented by plot portion 512, the tractive power available to the vehicle is at a relatively high level, representing the sum of battery and auxiliary power. This maximum power level represented by plot portion 512 extends from a charge condition denominated as "first charge" to the fully-charged condition. Between the "low charge" condition of the traction battery and the "first charge" condition, the amount of tractive power depends upon the state of charge of the traction battery, as suggested by plot portion 514. The effect of this type of control is to allow operation at full tractive power for a period of time, until the traction battery is partially discharged to the "first" level. As the traction battery drops just below the first level, the amount of battery power which is available to the traction motor is decreased slightly, in an amount which is hoped is not noticeable. This slight decrease in power at a point just below the first charge level of FIG. 5 somewhat reduces the rate of discharge of the traction battery. If the hill is long, the traction battery may discharge further. As the traction battery becomes further discharged in the region between the "low" and "first" charge condition of FIG. 5, relatively less of the battery power is made available to the traction motor, resulting in a further slowing of the vehicle. For the longest hills, the traction battery will ultimately reach the "low" charge condition which is deemed to be nominally discharged. When this level is reached, no more energy is extracted from the traction battery, and, in general, the state of charge of the traction battery cannot extend below the "low" charge level into plot portion 510, unless there is some other drain on the traction battery, such as an emergency override of battery protection under conditions of imminent danger to the vehicle or its occupants. With control as plotted in FIG. 5, there is no abrupt transition in tractive power at any point along the control curve. When the battery charge is just above the "low" charge point, and is making the transition to full operation from the auxiliary electrical source, the amount of tractive power provided by the traction battery is already very small, and the transition should be imperceptible to the vehicle driver.

Figure 6:
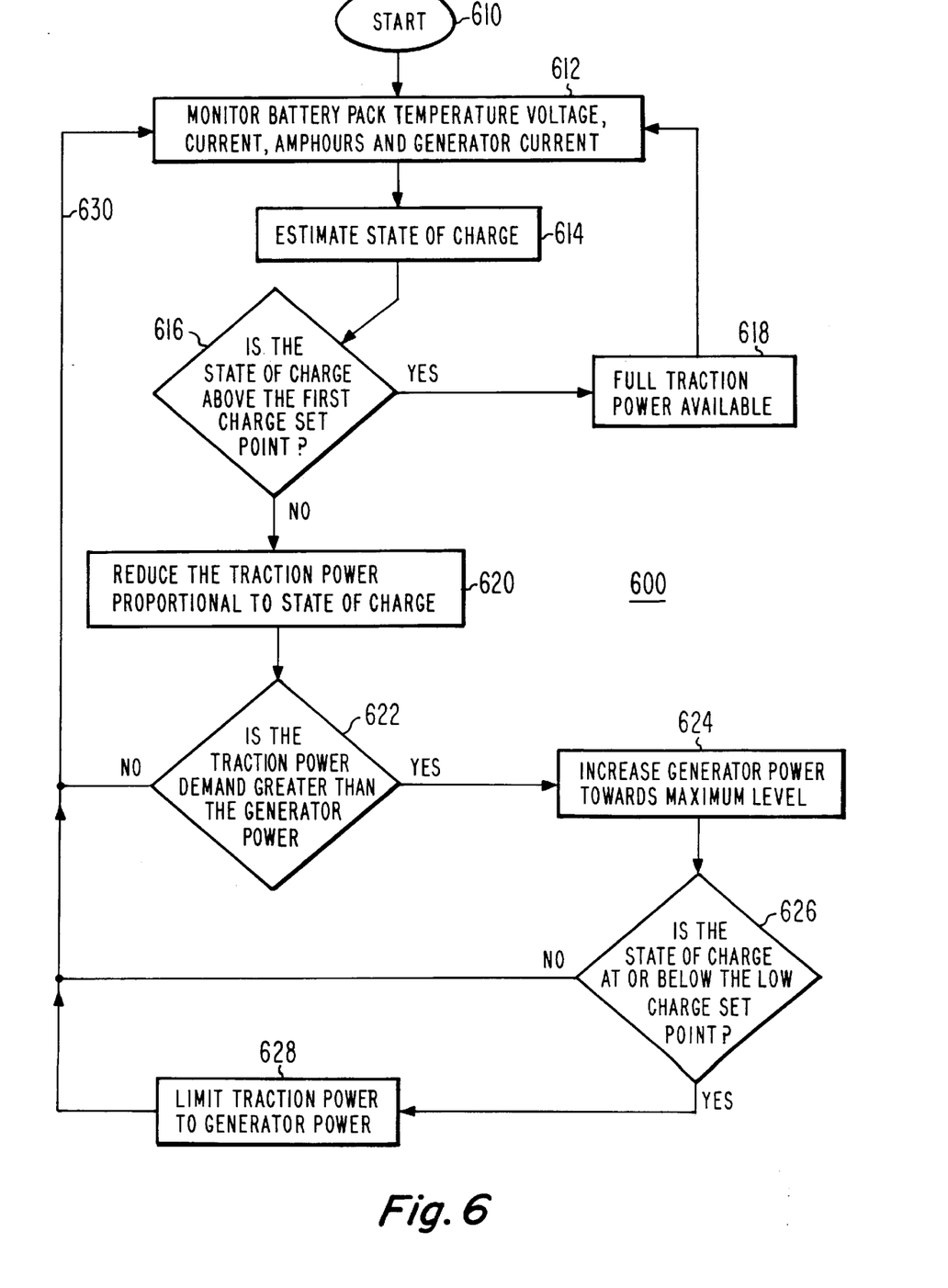
FIG. 6 is a simplified flow chart illustrating the logic flow in the command controller of FIGS. 1 and 2 to provide the operations illustrated in FIG. 5.

FIG. 6 is a simplified flow chart which illustrates that portion 600 of the logic of controller 50 of FIG. 1 which provides the control in accordance with plot 500 of FIG. 5. In FIG. 6, the logic begins at a START block 610, and proceeds to a block 612, which represents reading of the battery characteristics, much as in block 412 of FIG. 4. From block 512 of FIG. 5, the logic flows to a block 614, which represents estimation of the state of charge, also as described generally in FIG. 4. Decision block 616 of FIG. 6 determines if the current state of charge is above the "first" charge point of FIG. 5, and routes the logic by way of the YES output of decision block 616 if the charge state is greater than the "first" charge point. From the YES output of decision block 616, the logic flows to a block 618, which represents the making of full traction power available to the traction motor. This is accomplished by removing power limits, as described in conjunction with FIGS. 7a and 7b, in the software controlling the inverter, noting that the auxiliary source is a source only, while the battery and the motor/generator can be sources or sinks, depending on the operation of the inverter. From block 618, the logic flows back to block 612, to begin another iteration through the logic of FIG. 6. In general, when starting out with a near-fully charged traction battery, the logic will iterate around the loop including blocks 612, 614, 616, and 618 of FIG. 6 for so long as the traction battery charge exceeds the charge represented by the "first" charge level in FIG. 5.

On a long climb, the traction battery charge may eventually drop to equal or less than the "first" charge point of FIG. 5, and on the next iteration through the logic of FIG. 6, the logic 6 will exit decision block 616 by the NO output, and will proceed to a block 620. Block 620 represents reduction in the amount of power available to the traction motor from the traction battery in an amount which depends upon the magnitude of the current traction battery charge relative to the difference in charge between the "first" and "low" charge states of FIG. 5. For example, if the present-time level of charge of the traction battery drops below the "first" charge condition of FIG. 5 to a level represented in FIG. 5 as "current charge," which is 9/10 of the way between the charge levels represented by the "low" and "first" charge levels, controller 50 controls the amount of power available to the traction motor from the traction battery to be 90% of the battery-supplied component of the full power represented by plot portion 512. Put another way, since the current state of charge indicated in FIG. 5 as "current charge" is 90% of that component of the full traction power designated as being attributable to the battery, the battery power provided to the traction motor is reduced to 90% of the battery power. Naturally, there is no requirement that plot portion 514 of FIG. 5 be a linear ramp as illustrated, but the control system is simplified if plot portion 514 is at least monotonic. From block 620 of FIG. 6, the logic flows to a decision block 622, which compares the traction motor power demand with the power from the auxiliary source of electrical energy. If the traction power demand exceeds the power from the auxiliary source of electricity, the batteries are being discharged, and the logic leaves decision block 622 by the YES output. From the YES output of decision block 622, the logic flows to a block 624, which represents increasing the power available from the auxiliary source to its maximum value. From block 624, the logic flows to a decision block 626. Decision block 626 compares the current state of charge of the traction battery with the "low" charge point of FIG. 5. If the state of charge is below the "low" charge point, indicating that the traction battery should not be further discharged in order to prevent damage to the traction battery, the logic leaves decision block 626 by the YES output, and proceeds to a logic block 628. Block 628 represents limitation of the traction motor power, by FOC control, to the known amount of power available from the auxiliary source of electrical energy, readily determined as the product of the voltage multiplied by the current. From block 628, the logic flows by way of a logic path 630 back to block 612 by way of a logic path 630, to begin another iteration through the logic of FIG. 6. If, when decision block 626 examines the state of charge of the traction battery, the current state of charge is greater than the "low" charge point of FIG. 5, the logic leaves decision block 626 by the NO output, and proceeds over logic path 630 back to block 612, without transiting block 628. Thus, when there is significant usable charge in the traction battery, the logic of FIG. 6 permits its use. If, during the transit of the logic through FIG. 6, decision block 622 finds that the traction power is not greater than the power produced by auxiliary source 16, the logic leaves decision block 622 by the NO output, and proceeds by way of logic path 630 to block 612, to begin another iteration; this path bypasses the increasing of the power of the auxiliary source 16 to the maximum.

Figure 7A:
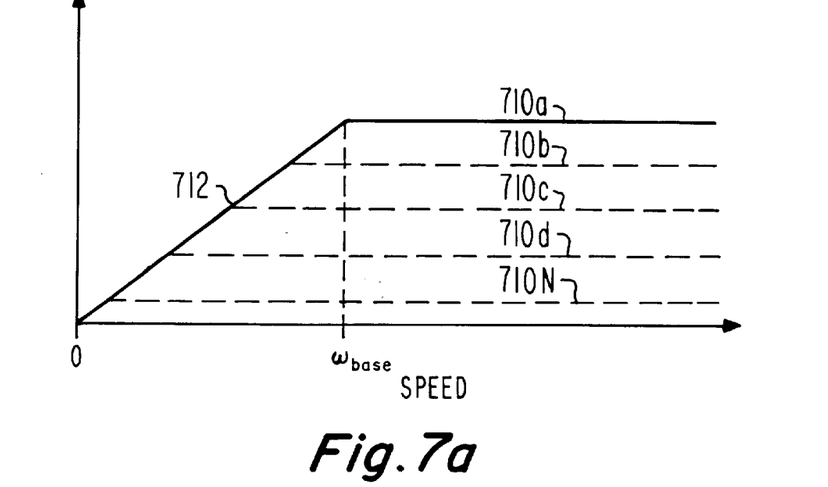
FIG. 7a is a plot of motor or generator power versus speed with torque as a parameter.
Figure 7B:
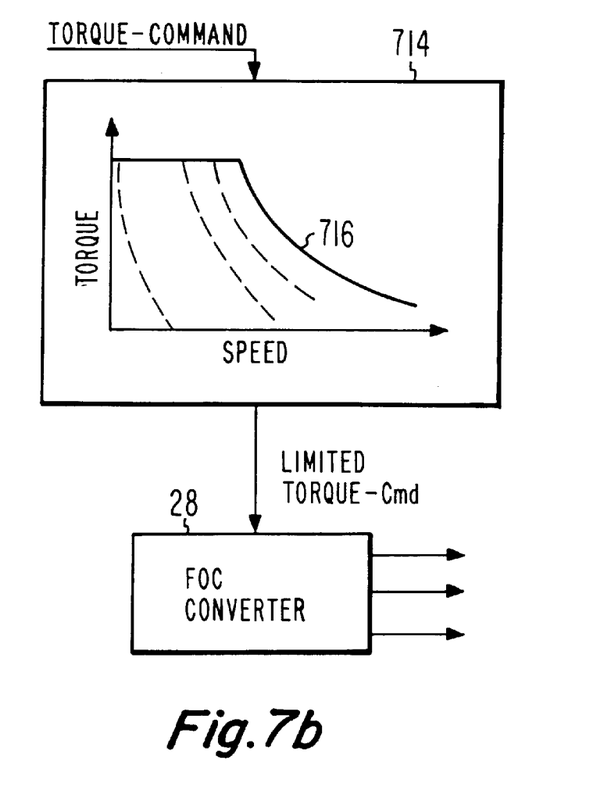
FIG. 7b is a representation of how the power of the motor/generator is controlled.

FIG. 7a illustrates a simplified parametric plot 710a, 710b, 710c . . . , 710N of motor (or generator) power versus speed. In FIG. 7a, plots 710a, 710b, 710c . . . , 710N have a sloped portion 712 in common. Power for a motor or generator is the product of torque multiplied by speed. Consequently, at zero speed, the power is zero, regardless of the torque. As speed increases at constant torque, the power increases, as suggested by portion 712 of the plots of FIG. 7a, up to a speed $\omega_{base}$. Above frequencies of $\omega_{base}$, the design of the motor/generator is such that no more power can be handled, for thermal or other reasons. Consequently, at maximum torque, the power of the motor/generator is limited by the control laws of the inverter to lie on plot 710a. If the torque is somewhat less than the maximum torque, the maximum power is achieved at a slightly lower motor speed than omega sub base, represented by plot 710b. Plot 710c represents a still lower magnitude of torque, and the lowermost plot, 710N, represents the lowest torque which the quantized control system can sustain. The control system will limit the torque produced by the motor to a limiting value, depending upon the speed, to prevent the motor from operating at above the desired maximum power limits. The limiting torque_limit is determined simply by dividing the maximum power by the current motor speed $$\text{torque\_limit} = P_{max}/\text{speed}$$

and the resulting limit on torque causes the power plot to limit at a value no greater than that represented in FIG. 7a by plot 710a and plot portion 712. If the power is to be limited to a lesser value than $P_{max}$, the power plot which the motor follows will correspond to one of plots 710b, 710c . . . , 710N of FIG. 7a. FIG. 7b is a simplified block diagram illustrating the relationship of the torque command and the power limiter. In FIG. 7b, the torque_command is applied to a limiter block 714, which adjusts the magnitude of the torque command (Limited Torque_Cmd) which arrives at the Field Oriented Control (FOC) inverter 28 in a manner which limits the power to lie under a curve 716. Curve 716 is a plot of torque versus speed determined by dividing the selected or set power P by the motor speed. Thus, the FOC inverter can control the power of the motor by control of the commanded torque in view of the motor speed. The torque in question may be traction or driving torque, or it may be retarding or braking torque. When control of the power flowing to the batteries from the motor, acting as a generator, is desired, the appropriate FOC commands result in application of the limit.

Figure 8:
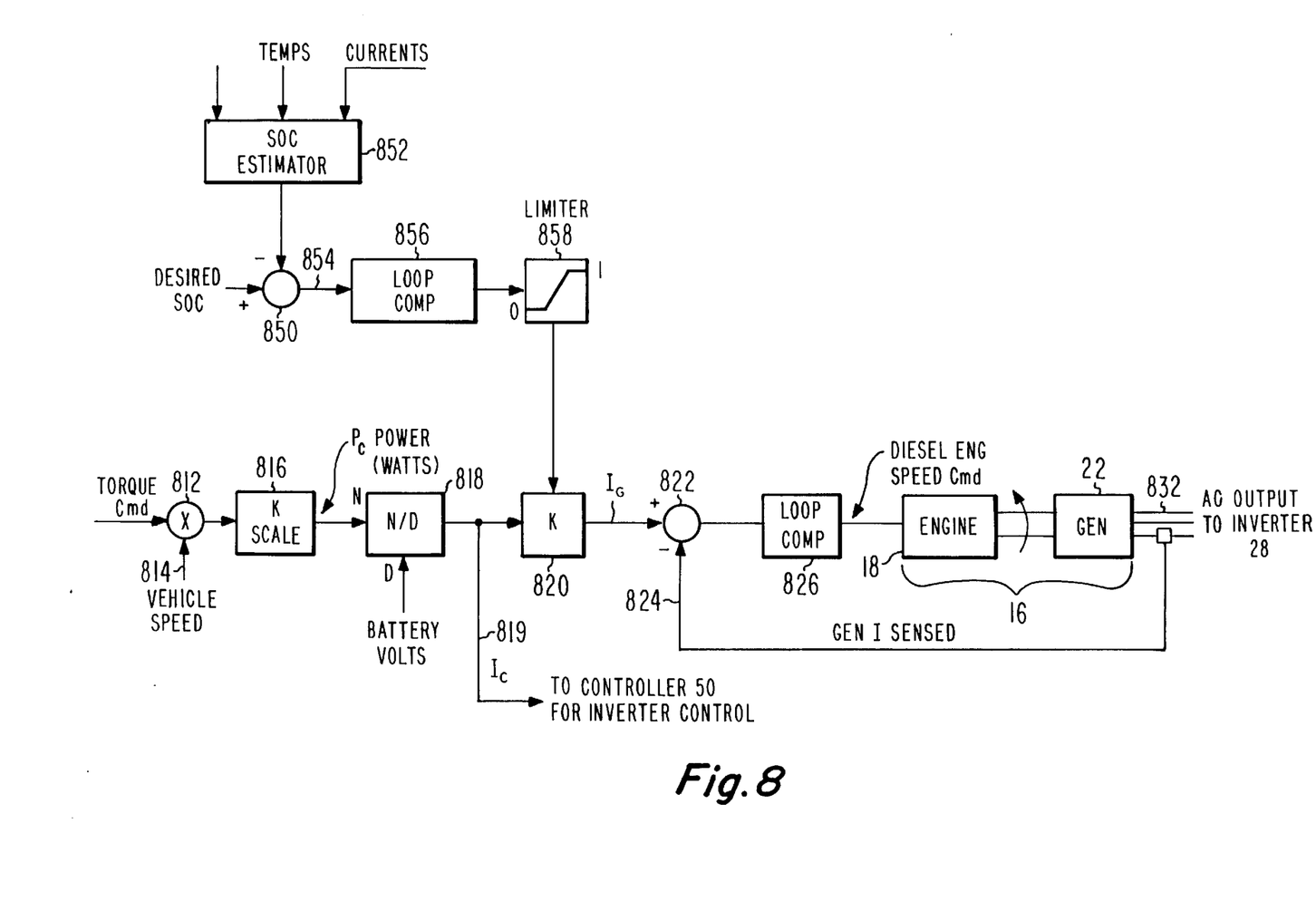
FIG. 8 is a simplified block diagram illustrating certain control circuits or arrangements for controlling the amount of electric power generated by the auxiliary power source in response to the state of charge of the traction battery.

In FIG. 8, the desired torque or torque command is derived from an electrical accelerator (not illustrated) and applied by way of a path 810 to a first input port of a multiplier 812, which receives sensed vehicle speed (or traction motor speed if the vehicle is equipped with changeable gears) from sensors (not illustrated) at its second input port 814. Multiplier 812 takes the product of motor speed and commanded torque, to produce a signal representing commanded power to be applied to the traction motor. A block 816 scales the commanded power by a constant k, if necessary, to convert the signal to a representation $P_C$ of commanded traction motor power in watts. The signal $P_C$ representing the commanded power in watts is applied from block 816 to a further block 818, which represents the division of the commanded power in watts by the traction battery voltage, to get a signal representing the commanded traction motor current ($I_C$=P/E). The traction battery voltage is an acceptable indicator of the traction motor voltage, because all the voltages in the system tend toward the battery voltage. The signal representing the commanded current $I_C$ is carried by a signal path 819 to a portion of the command controller 50 of FIG. 1 for control of the FOC inverter 28 and the traction motor 40 in a manner which produces the desired motor current. The signal representing the commanded current $I_C$ is also applied from the output of block 818 by way of a scaling circuit illustrated as a block 820 to an error signal generator 822. The purpose of the scaling circuit 820 is explained below, but its action results in conversion of the commanded motor current $I_C$ into commanded generator current $I_G$. Error signal generator 822 generates an error signal by subtracting a feedback signal from a signal path 824, representing the sensed output current of the internal-combustion-engine/generator (generator), from the commanded generator current $I_G$. The error signal produced by error signal generator 822 is applied to a loop compensating filter, which may be a simple integrator, to produce a signal representative of the commanded speed of the auxiliary source 16 of electrical energy, more specifically the diesel engine 18. The diesel engine 18 drives the electrical generator 22, to produce alternating output voltage for application by way of power conductors 832 to inverter 28 of FIG. 1. A current sensor arrangement illustrated as a circle 834 is coupled to the output conductors 832 for sensing the generator current. Blocks 822, 826, 18, 22, and 824 of FIG. 8 together constitute a closed feedback loop which tends to make the output current of generator 22 equal to the magnitude commanded by the control signal $I_G$ applied to the error generator. Loop compensator 826 is selected to prevent the speed of the diesel engine from changing too rapidly, which might undesirably result in an increase in emission of pollutants, As so far described, the arrangement of FIG. 8 produces a signal $I_C$ for commanding the traction motor current for control of the motion of the vehicle, and also produces a signal $I_G$ which commands the current of the auxiliary generator 22. In FIG. 8, a signal representing a desired state of charge (SOC) of the traction battery is received at the noninverting input port of a summing circuit 850. A signal representing the current state of charge is received at the inverting input port of summing circuit 850 from a battery state-of-charge (SOC) determining block 852. SOC block 852 receives signals representative of battery voltage, battery temperature, and battery currents. In general, the state of charge of a battery is simply the time integral of the net of the input and output currents. SOC block 852 integrates the net amperes of current to produce ampere-hours of charge. Summing circuit 850 produces, on a signal path 854, an error signal which represents the difference between the desired or commanded state of charge of the traction battery and its actual state of charge, to thereby identify an instantaneous surfeit or deficiency of charge. The error signal is applied to a loop compensating filter 856, which integrates the error signal, to produce an integrated error signal. The integrated error signal changes slowly as a function of time. The integrated error signal acts on block 820 by way of a limiter 858. More particularly, the integrated error signal, when applied to scaling block 820, selects the scaling factor by which the commanded motor current $I_C$ is scaled to make it into the commanded generator current. Limiter 858 merely limits the integrated error signal from block 856 so that the range of scaling factors of scaling block 820 is limited to the range between zero and one (unity). Thus, the commanded generator current $I_G$ can never be greater than the commanded traction motor current $I_C$, but can be less according to the scaling factor commanded by the limited integrated signal from limiter 858, and the commanded generator current $I_G$ can be as low as zero current.

The desired state of charge of the traction battery is a charge level which is less than full charge, so that regenerative braking can be applied without danger of damaging the traction battery due to overcharging. Thus, the set-point of the desired SOC is a charge less than full charge. The operation of the arrangement of FIG. 8 can be understood by assuming that the normal state of the output of the integrator in loop compensating filter 856 is 0.5 "volts," halfway between the 1.0 volt maximum and the 0.0 volt minimum permitted by limiter 858. The value of the integrated error signal (as limited by limiter 858) may be viewed as a multiplying factor by which scaling circuit 820 scales the commanded traction motor current, so that an integrated error signal having a value of 1.0 causes the commanded traction motor current $I_C$ to be transmitted at full amplitude by error signal generator 822, while a value of 0.5 would result in the magnitude of the commanded generator current $I_G$ to be exactly half of the magnitude of the commanded traction motor current $I_C$. In operation of the vehicle under the control of the arrangement of FIG. 8, as the traction battery exceeds the desired state of charge, error signal generator 850 subtracts a large signal value representing a high state of charge from the set-point value, thereby producing a difference or error signal having a negative polarity. The integrator in loop compensating filter 856 integrates the negative-polarity signal, which tends to "reduce" or drive negative the net integrated signal at the output of loop compensating filter 856 away from its "normal" value of 0.5 volts, possibly down toward 0.3 volts, as an example. Since a value of 0.3 volts of the integrated error signal lies within the permitted range of limiter 858, the integrated error signal simply flows through limiter 858, to control scaling circuit 820 in a manner which causes the commanded traction motor current $I_c$ to be multiplied by 0.3, rather than the "normal" 0.5, to produce the commanded generator current $I_G$. Thus, a state of battery charge greater than the desired set-point results in reduction of the average output of the generator. In the same manner, if the charge state of the traction battery is lower than the desired set-point, the signal applied from block 852 of FIG. 8 to the inverting input port of error signal generator 850 becomes smaller in magnitude than the signal representing the desired SOC, which results in a positive value of error signal at the output of error signal generator 850. The integrator associated with loop filter 856 integrates its positive input signal to produce an integrated output signal which tends to increase above its "normal" value of 0.5 volts, to a value of, for example, 0.8 volts. Since this value is within the values acceptable to limiter 858, the 0.8 volt integrated error signal is applied to scaling circuit 820 without change. The 0.8 volt integrated error voltage causes scaling circuit 820 to multiply the signal representing the commanded traction motor current $I_C$ by 0.8, so that the commanded generator current $I_G$ is greater than previously. The net effect of the decrease in traction battery charge to a value below the set-point is to increase the average output power from generator 22, which should tend to increase the traction battery charge level. Those skilled in the art will understand that the "normal" value of integrated error signal referred to above does not actually exist, and is used only to aid in understanding the operation of the control system.

Thus, a method (FIGS. 3*a*, 3*b*, and 4) for operating a vehicle (10) which derives at least some of its tractive effort or motive power from one or more electric batteries ("batteries") (20) includes the step (312; 418) of returning substantially all of the energy from a traction motor (40) to the batteries (20) during dynamic braking during those times when the batteries (20) are at a first charge condition (below first charge level) which is less than the full-charge condition. Other steps (420, 422) of the method include returning less than all of the energy (314) from the traction motor (40) to the batteries (20) during dynamic braking when the batteries are at a charge level between the first charge condition (first charge condition of FIGS. 3*a* and 3*b*) and the full-charge condition, and returning substantially no energy (plot 314 at full-charge point of FIG. 3*a*) from the traction motor (40) to the batteries (20) during braking when the batteries (20) reach the full-charge condition. In this embodiment, the step (420, 422) of returning less than all of the energy from the traction motor (40) to the batteries (20) includes the step of returning an amount of the available dynamic braking energy to the batteries (20) which is monotonically related (ramp 314) in the proportion of the present-time battery charge ($C_C$) relative to the full-charge condition. In a preferred embodiment of the invention, the abovedescribed steps transition smoothly from one to the other depending upon the state of charge of the batteries. As the amount of dynamic braking changes gradually as a function of battery charge, the friction brakes (36*a*, 36*b*) take up any deficiency in braking, automatically as a result of operator brake pedal (30*a*) force.

What is claimed is:

1. A method for operating a vehicle which derives at least some of its tractive effort from electric batteries, comprising the steps of:

determining state of charge of said batteries from at least battery voltage, battery temperature, and battery current;

returning substantially all of the energy from a traction motor to said batteries during dynamic braking when said batteries are at a first charge condition which is less than full charge;

returning less than all of said energy from said traction motor to said batteries during dynamic braking when said batteries are at a charge level lying between said first charge condition and said full-charge condition; and returning substantially no energy from said traction motor to said batteries during braking when said batteries reach said full-charge condition.

2. A method according to claim 1, wherein said step of returning less than all of said energy from said traction motor to said batteries includes the step of returning an amount of the available dynamic braking energy to said batteries which is monotonically related to the proportion of said charge relative to said full charge.

3. A method according to claim 1, further comprising the step of making a smooth transition between said steps of returning substantially all of said energy and returning less than all said energy, and between said steps of returning less than all said energy and returning substantially no energy.

* * * * *